(12) United States Patent
Campbell

(10) Patent No.: US 11,918,145 B1
(45) Date of Patent: Mar. 5, 2024

(54) GRILL GRATE-OILING DEVICE

(71) Applicant: William Campbell, Bismark, ND (US)

(72) Inventor: William Campbell, Bismark, ND (US)

( * ) Notice: Subject to any disclaimer, the term of this patent is extended or adjusted under 35 U.S.C. 154(b) by 150 days.

(21) Appl. No.: 17/706,713

(22) Filed: Mar. 29, 2022

(51) Int. Cl.
*A47J 37/07* (2006.01)
*B05C 17/00* (2006.01)
*B05C 17/005* (2006.01)

(52) U.S. Cl.
CPC ......... *A47J 37/0786* (2013.01); *B05C 17/003* (2013.01); *B05C 17/005* (2013.01); *B05C 17/00583* (2013.01)

(58) Field of Classification Search
CPC .............. B05C 17/003; B05C 17/005; B05C 17/00503; B05C 17/00516; B05C 17/00583; A47J 37/0786
USPC .................................................. 401/183–186
See application file for complete search history.

(56) References Cited

U.S. PATENT DOCUMENTS

| | | | |
|---|---|---|---|
| 4,961,661 A * | 10/1990 | Sutton | A45D 34/04 D28/7 |
| 5,015,112 A | 5/1991 | Arnold | |
| D674,671 S | 1/2013 | Borovicka | |
| 8,672,572 B1 | 3/2014 | Almada | |
| 8,961,054 B2 | 2/2015 | Gilbert | |
| 9,474,416 B2 | 10/2016 | Zarinkia | |
| 9,675,209 B2 | 6/2017 | Roth | |
| 2001/0053305 A1* | 12/2001 | Berke | A45D 34/04 401/184 |
| 2005/0207820 A1 | 2/2005 | Franczak | |

FOREIGN PATENT DOCUMENTS

WO  2015126445  8/2015

* cited by examiner

*Primary Examiner* — David J Walczak
(74) *Attorney, Agent, or Firm* — Kyle A. Fletcher, Esq.

(57) ABSTRACT

The grill grate-oiling device comprises a body reservoir, a ball joint, a valve locker, a valve support, a spring, and an applicator. The grill grate-oiling device may be operable to apply oil to grates of a grill in order to prevent food from sticking to the grates. The grill grate-oiling device may be spill-resistant such that the device will not leak if tipped or knocked over. The oil may be dispensed from within the body reservoir when the body reservoir is squeezed. The oil may be applied to the grates by rubbing the applicator over the grates. The ball joint may be operable to vary a dispensing angle between the applicator and the body reservoir.

19 Claims, 5 Drawing Sheets

GRILL GRATE-OILING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of grilling utensils, more specifically, a grill grate-oiling device.

SUMMARY OF INVENTION

The grill grate-oiling device comprises a body reservoir, a ball joint, a valve locker, a valve support, a spring, and an applicator. The grill grate-oiling device may be operable to apply oil to grates of a grill in order to prevent food from sticking to the grates. The grill grate-oiling device may be spill-resistant such that the device will not leak if tipped or knocked over. The oil may be dispensed from within the body reservoir when the body reservoir is squeezed. The oil may be applied to the grates by rubbing the applicator over the grates. The ball joint may be operable to vary a dispensing angle between the applicator and the body reservoir.

An object of the invention is to apply oil to the grates of a grill in a safe, sanitary, and efficient manner.

Another object of the invention is to dispense oil contained within a body reservoir through a spring-loaded valve locker when the body reservoir is squeezed.

A further object of the invention is to apply the oil to the grates via a heat-resistant applicator.

Yet another object of the invention is to provide a ball joint to vary the dispensing angle.

These together with additional objects, features and advantages of the grill grate-oiling device will be readily apparent to those of ordinary skill in the art upon reading the following detailed description of the presently preferred, but nonetheless illustrative, embodiments when taken in conjunction with the accompanying drawings.

In this respect, before explaining the current embodiments of the grill grate-oiling device in detail, it is to be understood that the grill grate-oiling device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grill grate-oiling device.

It is therefore important that the claims be regarded as including such equivalent construction insofar as they do not depart from the spirit and scope of the grill grate-oiling device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
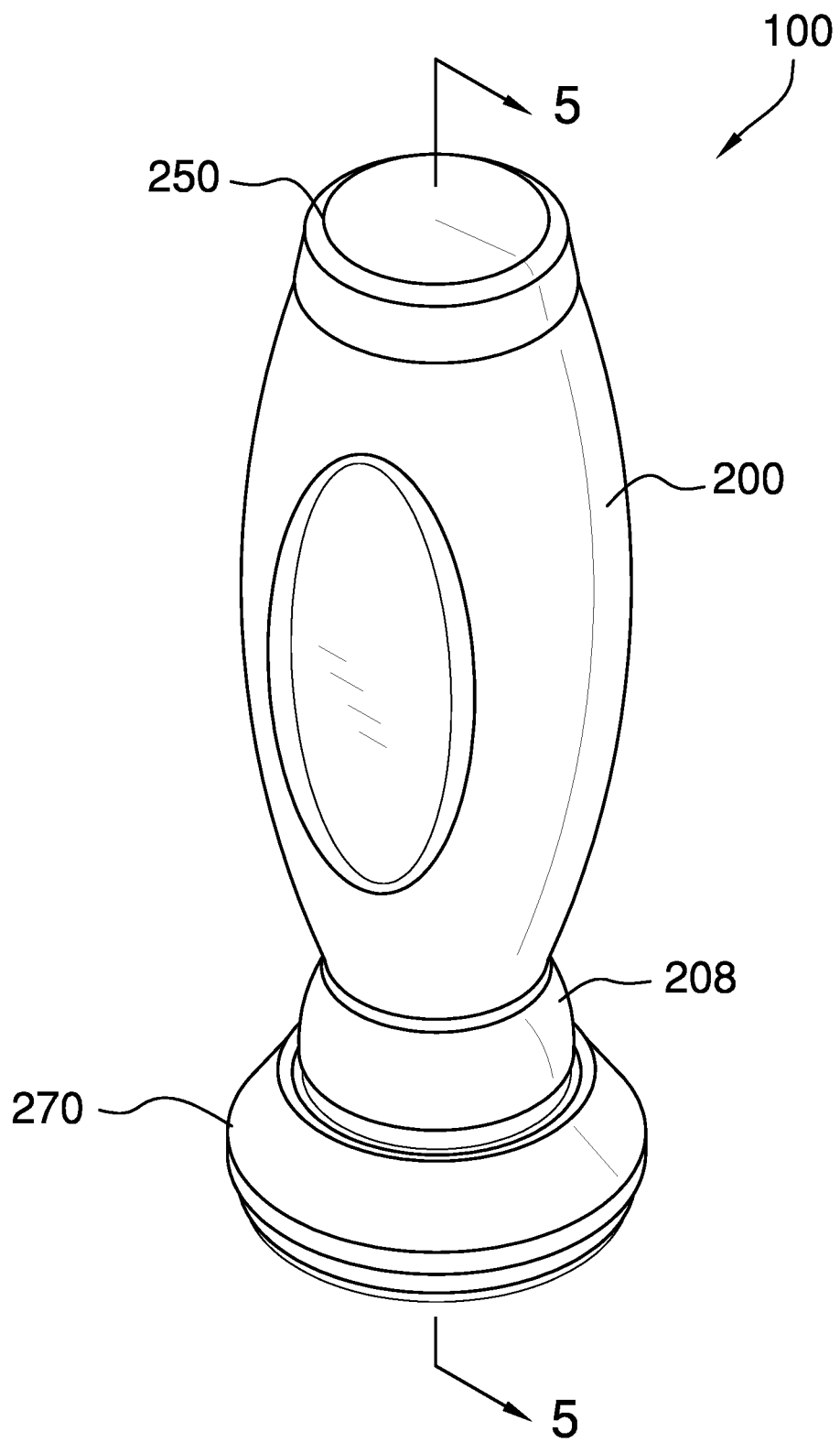
FIG. 1 is an isometric view of an embodiment of the disclosure.
Figure 2:
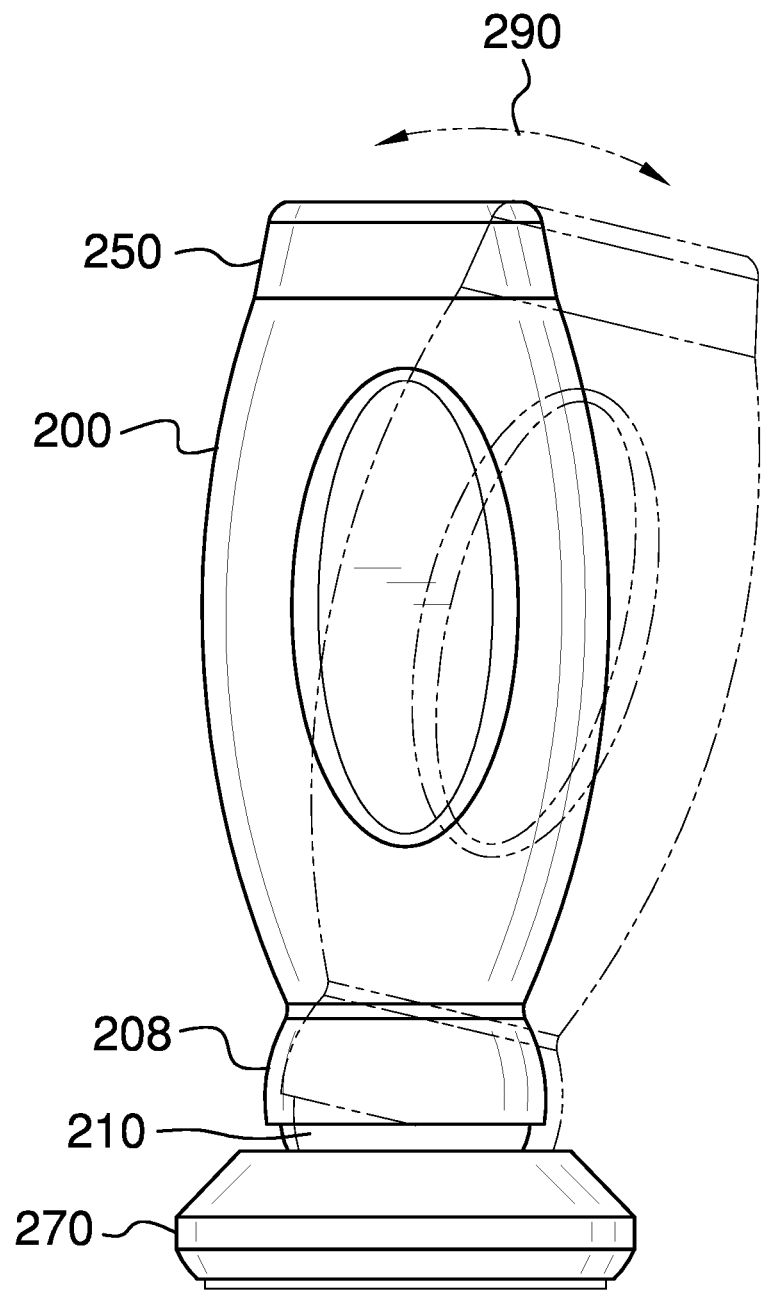
FIG. 2 is a front view of an embodiment of the disclosure.
Figure 3:
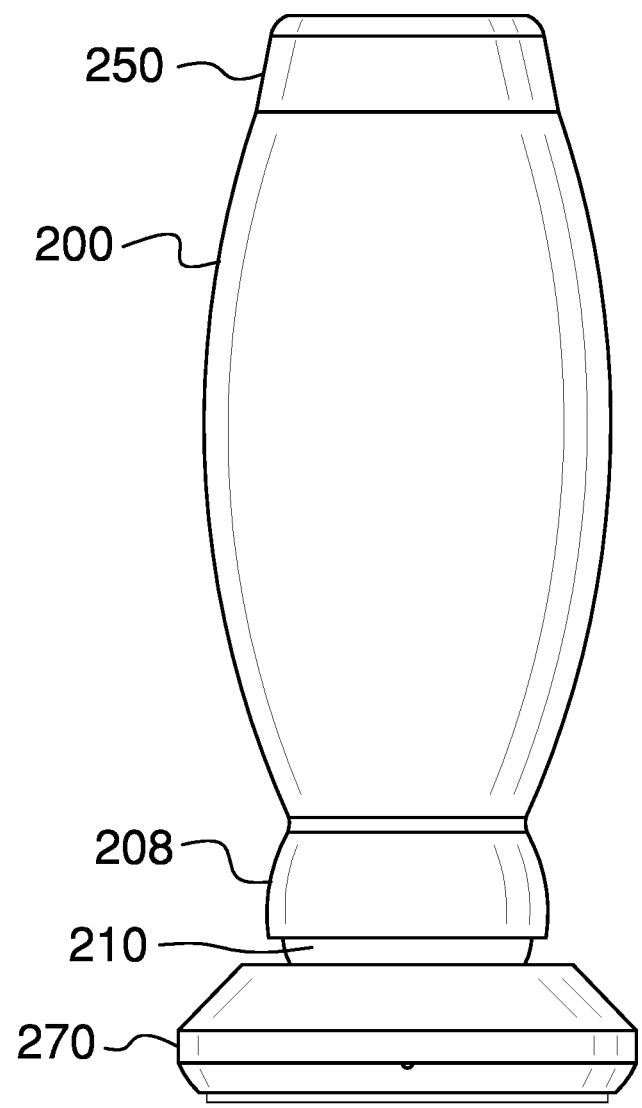
FIG. 3 is a rear view of an embodiment of the disclosure.
Figure 4:
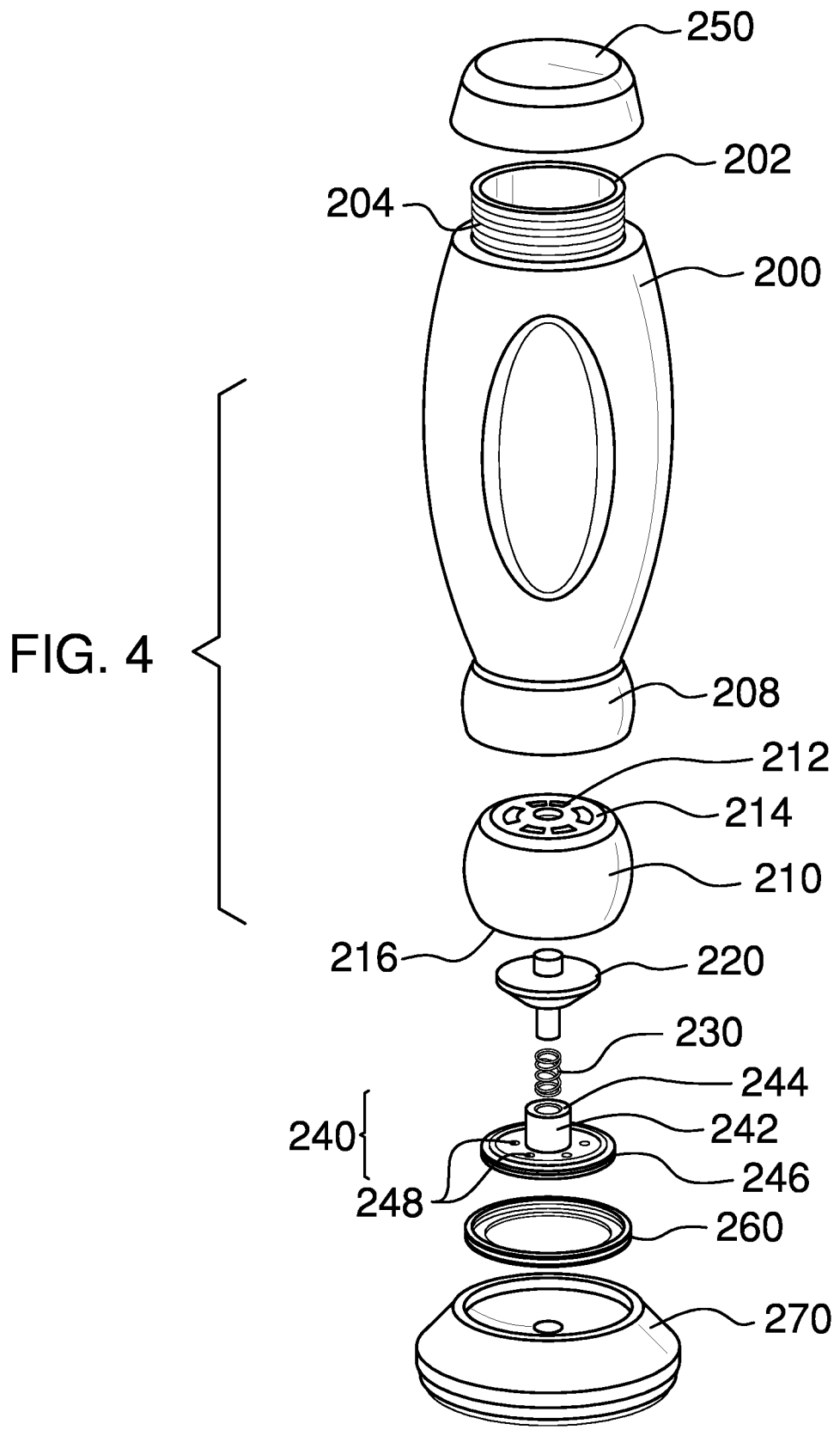
FIG. 4 is an exploded view of an embodiment of the disclosure.
Figure 5:
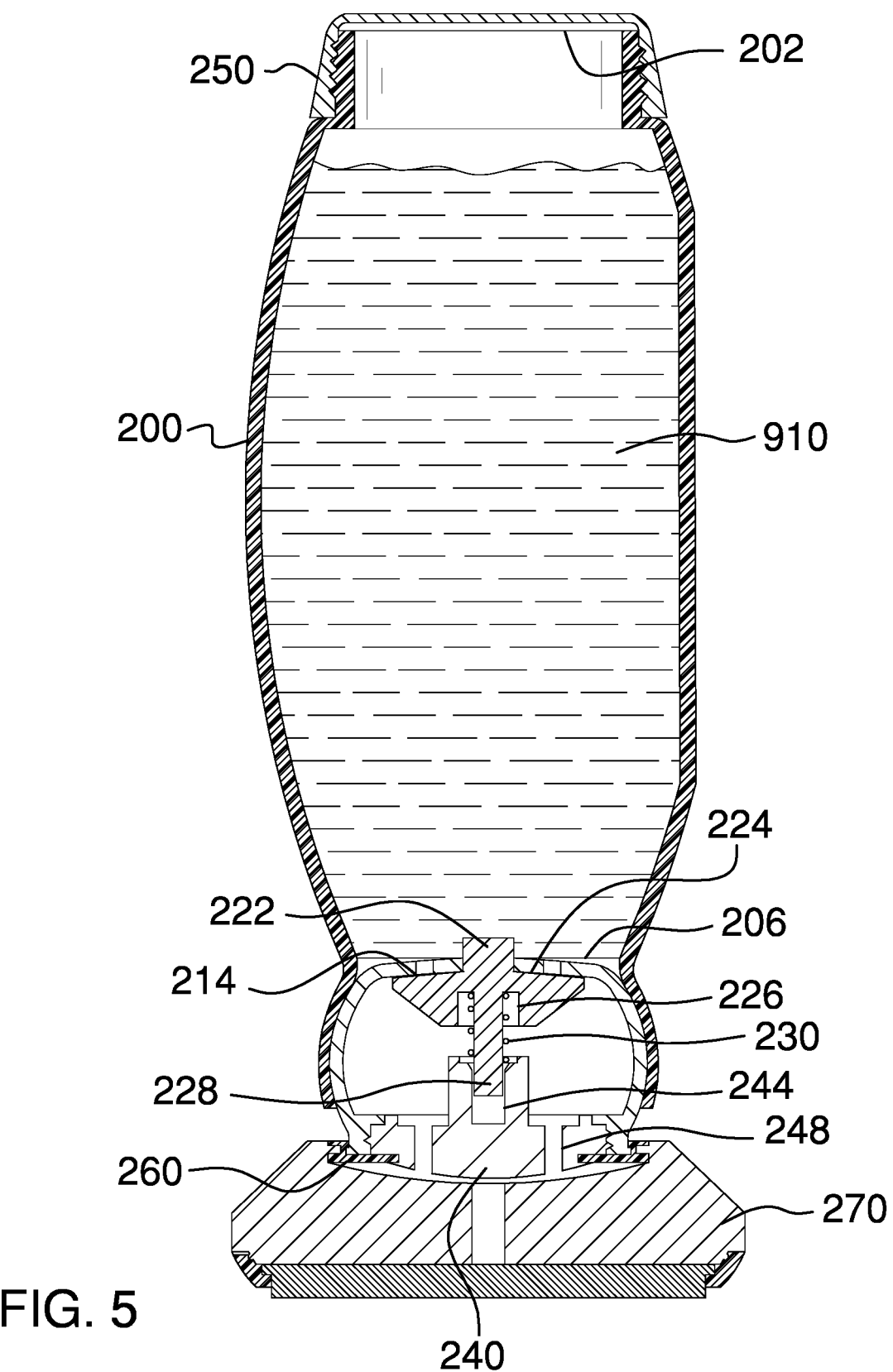
FIG. 5 is a cross-sectional view of an embodiment of the disclosure across 5-5 as shown in FIG. 1.

Detailed reference will now be made to a first potential embodiment of the disclosure, which is illustrated in FIGS. 1 through 5.

The grill grate-oiling device 100 (hereinafter invention) comprises a body reservoir 200, a ball joint 210, a valve locker 220, a valve support 240, a spring 230, and an applicator 270. The invention 100 may be operable to apply oil 910 to grates of a grill in order to prevent food from sticking to the grates. The invention 100 may be spill resistant and will not leak if tipped or knocked over. The oil 910 may be dispensed from within the body reservoir 200 when the body reservoir 200 is squeezed. The oil 910 may be applied to the grates by rubbing the applicator 270 over the grates. The ball joint 210 may be operable to vary a dispensing angle 290 between the applicator 270 and the body reservoir 200.

The body reservoir 200 may be a hollow container for storing the oil 910 that is to be dispensed onto the grates. The body reservoir 200 may be semi-rigid such that the body reservoir 200 may be squeezed to dispense the oil 910 and the body reservoir 200 will return to its original shape when the squeezing force is removed. The body reservoir 200 may comprise a refill aperture 202 located at the top of the body reservoir 200 for adding the oil 910. A cap 250 may screw onto a threaded collar 204 surrounding the refill aperture 202 to block the refill aperture 202. The cap 250 may be removed for refilling the body reservoir 200 and replaced in preparation for use.

The body reservoir 200 may comprise an outflow aperture 206 located at the bottom of the body reservoir 200. The outflow aperture 206 may be blocked by the valve locker 220 to prevent the oil 910 from flowing out of the body reservoir 200.

As non-limiting examples, the oil 910 may be a cooking oil having a high smoke point temperature such as canola oil, peanut oil, vegetable oil, sunflower oil, and avocado oil.

The body reservoir 200 may comprise a cowl 208 located at the bottom of the body reservoir 200. The cowl 208 may be a flared bottom of the body reservoir 200 such that the body reservoir 200 may pivotably couple with the ball joint 210.

The ball joint 210 may pivotably couple to the bottom of the body reservoir 200 via the cowl 208. A central portion of the ball joint 210 may be a spherically shaped such that the ball joint 210 may swivel within the cowl 208. The top of the ball joint 210 may be exposed to the oil 910 within the body reservoir 200 via the outflow aperture 206 of the body reservoir 200. The coupling between the cowl 208 and the ball joint 210 may prevent the oil 910 from leaking out of the body reservoir 200 between the cowl 208 and the ball joint 210.

The ball joint 210 may be hollow. The top of the ball joint 210 may comprise a ball top center aperture 212 and ball top oil apertures 214. The ball top center aperture 212 may be located at the center top of the ball joint 210 and may guide vertical movement of the valve locker 220. The ball top oil apertures 214 may be blocked by the valve locker 220 such that the oil 910 may not flow into the ball joint 210 from the body reservoir 200 through the ball top oil apertures 214. When the body reservoir 200 is squeezed, pressure from the oil 910 may displace the valve locker 220 downward and permit the oil 910 to flow through the ball top oil apertures 214 into the ball joint 210.

The bottom of the ball joint 210 may comprise a ball bottom aperture 216. The valve support 240 may couple to the ball joint 210 at the ball bottom aperture 216. The oil 910 within the ball joint 210 may flow out of the ball joint 210 and onto the applicator 270 through support oil apertures 248 located in the valve support 240.

The valve locker 220 may be a valve that blocks the flow of the oil 910 from the body reservoir 200 into the ball joint 210. Specifically, an upper surface 224 of the valve locker 220 may block the ball top oil apertures 214 and the ball top center aperture 212 when the valve locker 220 is pressed upwards by the spring 230. The valve locker 220 may comprise an upper center peg 222 projecting vertically upward from the center of the upper surface 224. The upper center peg 222 may pass through the ball top center aperture 212 to guide vertical movement of the valve locker 220. The valve locker 220 may comprise a lower center peg 228 projecting vertically downward from the center of the valve locker 220. The lower center peg 228 may extend into a support well 244 of the valve support 240 to guide vertical movement of the valve locker 220. The valve locker 220 may comprise a spring well 226 which may be an upward indentation of the bottom of the valve locker 220 surrounding the lower center peg 228. The spring well 226 may provide clearance for the top of the spring 230.

The valve support 240 may comprise a center boss 242 which may extend upward along a center vertical axis of the ball joint 210. The center boss 242 may comprise the support well 244 which may be a downward depression of the center of the center boss 242 along the center vertical axis. The valve support 240 may comprise a support flange 246 which may be a horizontal widening of the valve support 240 surrounding the center boss 242. The support flange 246 may couple to the ball bottom aperture 216 of the ball joint 210.

The spring 230 may be made from an elastic material and may store mechanical energy. The spring 230 may be helical in shape and may comprise a default length when no external forces are exerted on the spring 230. The spring 230 may be compressed between the valve locker 220 and the valve support 240. The spring 230 may force the valve locker 220 upwards to prevent the oil 910 from flowing out of the body reservoir 200. Pressure within the body reservoir 200 due to squeezing the body reservoir 200 may exert a downward force that may overcome the upward force of the spring 230 such that the valve locker 220 may move down and the oil 910 may flow out of the body reservoir 200. The spring 230 may exert an upward force on the valve locker 220 to stop the oil 910 when the pressure within the body reservoir 200 diminishes as the squeezing of the body reservoir 200 ceases.

The applicator 270 may be a heat-resistant pad for applying the oil 910 to the grates. The applicator 270 may be supplied with the oil 910 from above as the oil 910 flows out of the ball joint 210 through the support oil apertures 248. The applicator 270 may be retained on the valve support 240 by an applicator ring 260.

In a preferred embodiment, the spring 230 may be made of zinc-plated steel wire and the applicator 270 may be made of ceramic fiber. The body reservoir 200, the cap 250, the ball joint 210, the valve locker 220, the valve support 240, the applicator ring 260, or any combination thereof may be made from PDCPD plastic.

In use, the body reservoir 200 is filled with oil 910 by unscrewing the cap 250, pouring the oil 910 into the body reservoir 200 through the refill aperture 202, and screwing the cap 250 back on. The invention 100 may stand on the applicator 270 when not in use. Whether standing or laying on the side, the oil 910 will not leak from the invention 100. To apply the oil 910 to the grates, the applicator 270 may be placed on the grates, the body reservoir 200 may be squeezed to release the oil 910 into the ball joint 210, and the applicator 270 may be rubbed over the grates as the oil 910 drains from the ball joint 210 onto the applicator 270. The dispensing angle 290 may made altered by tilting the body reservoir 200 at the ball joint 210. Changing the dispensing angle 290 may make the body reservoir 200 more comfortable to hold.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used herein, "ball joint" may refer to a type of coupling that allows at least limited rotation around three perpendicular axis.

As used herein, "boss" may refer to a protruding feature on an element. A common use for a boss is to align two objects by locating a boss on one object within a pocket or hole of another object. A boss may also be used for ornamental purposes. A boss may also refer to a mounting feature that will receive a screw.

As used in this disclosure, a "collar" may be a ring like device that is placed around an object.

As used herein, the words "couple", "couples", "coupled" or "coupling", may refer to connecting, either directly or indirectly, and does not necessarily imply a mechanical connection.

As used in this disclosure, "elastic" may refer to a material or object that deforms when a force is applied to stretch or compress the material and that returns to its relaxed shape after the force is removed. A material that exhibits these qualities is also referred to as an elastomeric material.

As used herein, "filling", or "refilling", refers to the act of placing a first item into a second item whether the quantity of the first item fills the second item or not. As non-limiting examples, the first item may be a liquid, such as water, oil, or gasoline, or a granulated solid, such as sand or coffee beans. As non-limiting examples, the second item may be a bin, a bottle, a tank, or another type of container.

As used in this disclosure, a "flange" may be a protruding rib, edge, or collar that is used to hold an object in place or to attach a first object to a second object.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "grate" may be a plurality of parallel metal bars or a metal structure comprising a mesh structure formed from metal bars.

As used in this disclosure, a "helix" may be the three dimensional structure that is formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute. "Helical" may be an adjective which indicates that an object is shaped like a helix.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "PDCPD" or "polydicyclopentadiene" may refer to a thermosetting plastic that can replace metal, fiberglass, and a number of polymers due to its unique properties. PDCPD plastic may exhibit high impact resistance, high chemical corrosion resistance, and high Heat Deflection Temperature.

As used herein, "resilient" or "semi-rigid" may refer to an object or material which will deform when a force is applied to it and which will return to its original shape when the deforming force is removed.

As used herein, "smoke point" may refer to the temperature at which an oil or fat begins to produce visible smoke.

As used in this disclosure, a "spring" may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "valve" may be a device that is used to control the flow of a fluid, either gas or liquid, through a pipe or to control the flow of a fluid into and out of a container. Some valves may have multiple ports and may allow the diverting or mixing of fluids.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A grill grate-oiling device comprising:
   a body reservoir, a ball joint, a valve locker, a valve support, a spring, and an applicator;
   wherein the grill grate-oiling device is operable to apply oil to grates of a grill in order to prevent food from sticking to the grates;
   wherein the grill grate-oiling device will not leak if tipped or knocked over;
   wherein the oil is dispensed from within the body reservoir when the body reservoir is squeezed;
   wherein the oil is applied to the grates by rubbing the applicator over the grates;
   wherein the ball joint is operable to vary a dispensing angle between the applicator and the body reservoir;
   wherein the body reservoir comprises an outflow aperture located at a bottom of the body reservoir;
   wherein the valve locker prevents the oil from flowing out of the body reservoir;
   wherein a top of the ball joint comprises a ball top center aperture and ball top oil apertures;
   wherein the ball top center aperture is located at a center top of the ball joint and guides vertical movement of the valve locker.

2. The grill grate-oiling device according to claim 1
   wherein the body reservoir is a hollow container for storing the oil that is to be dispensed onto the grates.

3. The grill grate-oiling device according to claim 2
   wherein the body reservoir is semi-rigid such that the body reservoir is squeezed to dispense the oil and the body reservoir will return to its original shape when the squeezing force is removed.

4. The grill grate-oiling device according to claim 3
   wherein the body reservoir comprises a refill aperture located at a top of the body reservoir for adding the oil.

5. The grill grate-oiling device according to claim 4
wherein a cap screws onto a threaded collar surrounding the
refill aperture to block the refill aperture;
  wherein the cap is removed for refilling the body reservoir
    and replaced in preparation for use.
6. The grill grate-oiling device according to claim 5
wherein the body reservoir comprises a cowl located at
    the bottom of the body reservoir;
  wherein the cowl is a flared bottom of the body reservoir
    such that the body reservoir pivotably couples with the
    ball joint.
7. The grill grate-oiling device according to claim 6
wherein the ball joint pivotably couples to the bottom of
    the body reservoir via the cowl;
  wherein a central portion of the ball joint is a spherically
    shaped such that the ball joint swivels within the cowl.
8. The grill grate-oiling device according to claim 7
wherein the top of the ball joint is exposed to the oil
    within the body reservoir via the outflow aperture of the
    body reservoir.
9. The grill grate-oiling device according to claim 8
wherein the coupling between the cowl and the ball joint
    prevents the oil from leaking out of the body reservoir
    between the cowl and the ball joint.
10. The grill grate-oiling device according to claim 9
wherein the ball joint is hollow;
  wherein the ball top oil apertures are blocked by the valve
    locker such that the oil does not flow into the ball joint
    from the body reservoir through the ball top oil apertures;
  wherein when the body reservoir is squeezed, pressure
    from the oil displaces the valve locker downward and
    permits the oil to flow through the ball top oil apertures
    into the ball joint.
11. The grill grate-oiling device according to claim 10
wherein a bottom of the ball joint comprises a ball bottom
    aperture;
  wherein the valve support couples to the ball joint at the
    ball bottom aperture;
  wherein the oil within the ball joint flows out of the ball
    joint and onto the applicator through support oil apertures located in the valve support.
12. The grill grate-oiling device according to claim 11
wherein the valve locker is a valve that blocks the flow of
    the oil from the body reservoir into the ball joint;
  wherein an upper surface of the valve locker blocks the
    ball top oil apertures and the ball top center aperture
    when the valve locker is pressed upwards by the spring.
13. The grill grate-oiling device according to claim 12
wherein the valve locker comprises an upper center peg
    projecting vertically upward from the center of the
    upper surface;
  wherein the upper center peg passes through the ball top
    center aperture to guide vertical movement of the valve
    locker.
14. The grill grate-oiling device according to claim 13
wherein the valve locker comprises a lower center peg
    projecting vertically downward from the center of the
    valve locker;
  wherein the lower center peg extends into a support well
    of the valve support to guide vertical movement of the
    valve locker.
15. The grill grate-oiling device according to claim 14
wherein the valve locker comprises a spring well which is
    an upward indentation of a bottom of the valve locker
    surrounding the lower center peg;
  wherein the spring well provides clearance for a top of the
    spring.
16. The grill grate-oiling device according to claim 15
wherein the valve support comprises a center boss which
    extends upward along a center vertical axis of the ball
    joint;
  wherein the center boss comprises the support well which
    is a downward depression of the center of the center
    boss along the center vertical axis;
  wherein the valve support comprises a support flange
    which is a horizontal widening of the valve support
    surrounding the center boss;
  wherein the support flange couples to the ball bottom
    aperture of the ball joint.
17. The grill grate-oiling device according to claim 16
wherein the spring is made from an elastic material and
    stores mechanical energy;
  wherein the spring is helical in shape and comprises a
    default length when no external forces are exerted on
    the spring;
  wherein the spring is compressed between the valve
    locker and the valve support;
  wherein the spring forces the valve locker upwards to
    prevent the oil from flowing out of the body reservoir;
  wherein pressure within the body reservoir due to squeezing the body reservoir exerts a downward force that
    overcomes an upward force of the spring such that the
    valve locker moves down and the oil flows out of the
    body reservoir;
  wherein the spring exerts an upward force on the valve
    locker to stop the oil when the pressure within the body
    reservoir diminishes as the squeezing of the body
    reservoir ceases.
18. The grill grate-oiling device according to claim 17
wherein the applicator is a heat-resistant pad for applying
    the oil to the grates;
  wherein the applicator is supplied with the oil from above
    as the oil flows out of the ball joint through the support
    oil apertures;
  wherein the applicator is retained on the valve support by
    an applicator ring.
19. The grill grate-oiling device according to claim 18
wherein the spring is made of zinc-plated steel wire and
    the applicator is made of ceramic fiber;
  wherein the body reservoir, the cap, the ball joint, the
    valve locker, the valve support, the applicator ring, or
    any combination thereof are made from PDCPD plastic.

\* \* \* \* \*